United States Patent [19]

Ishida

[11] 4,418,998

[45] Dec. 6, 1983

[54] AUTOMATIC FOCUSING DEVICE FOR THE CAMERA

[75] Inventor: Hiroaki Ishida, Chiba, Japan

[73] Assignee: Seiko Koki Kabushiki Kaisha, Tokyo, Japan

[21] Appl. No.: 379,152

[22] Filed: May 17, 1982

Related U.S. Application Data

[63] Continuation of Ser. No. 143,913, Apr. 25, 1980, abandoned.

[30] Foreign Application Priority Data

Apr. 28, 1979 [JP] Japan .................................. 54-52861

[51] Int. Cl.³ .................... G03B 3/00; G03B 17/38
[52] U.S. Cl. .................................... 354/405; 354/266
[58] Field of Search ................ 354/25 R, 25 P, 25 N, 354/162-169, 195, 198, 266

[56] References Cited

U.S. PATENT DOCUMENTS

4,229,089 10/1980 Kitai et al. .......................... 354/25

Primary Examiner—William B. Perkey
Attorney, Agent, or Firm—Robert E. Burns; Emmanuel J. Lobato; Bruce L. Adams

[57] ABSTRACT

In an automatic focusing camera capable of bringing the lens into focus by automatically detecting the distance between the object and the camera, an automatic focusing device for a camera comprises an actuating member which is operated prior to the start of shutter operation, and a retainer which retains the actuating member at the initial stage of the release operation. The retainer is adapted to cancel the retention of the actuating member prior to start of the shutter operation by the shutter releasing member. The actuating member is interlocked with a coincidence type rangefinder which detects the focus of the lens and the actuating member can be returned to its initial position interlocking with the return motion of the shutter releasing member.

4 Claims, 2 Drawing Figures

AUTOMATIC FOCUSING DEVICE FOR THE CAMERA

This is a continuation of application Ser. No. 143,913, filed Apr. 25, 1980, now abandoned.

BACKGROUND OF THE INVENTION

This invention relates to a device generally defined as an automatic focusing device which electrically detects the focus and automatically brings the lens into focus.

The conventional automatic focusing device utilizes the principle of the coincidence type rangefinder in which a pair of photoelectric elements are provided and the lens is fixed at a focus position at a focus signal given at coincidence of an image made by a stationary mirror and an image made by a movable mirror coupled with the lens. In this system, when focus detection is impossible, shutter is released with the lens adjusted to a position corresponding to infinite range or minimum range as the lens driving member is used also for releasing the shutter. Furthermore, this system has an inconvenience that the range indication is recognizable only after the photographing procedure has been completed.

There has been introduced another system in which the operations of the movable mirror and the lens stopping member are coupled with the shutter release operation. In this system, range indication is recognizable before the shutter release operation as the position of the lens stopping member is determined prior to lens driving operation, however, this system has the disadvantage, particularly in a system employing an electromagnetic device for retaining the lens stopping member, that lens stopping member retaining position varies according to the shutter releasing speed as the operating speed of the movable mirror and the lens stopping member varies according to the variation of the shutter releasing speed.

Either conventional systems as referred to hereinbefore have the disadvantage that the focusing accuracy is greatly affected by difference between the stationary and the movable optical passages or variation in the sensitivity between the photoelectric elements as the optical system of the coincidence type rangefinder is consisted of two optical passages as a stationary optical passage and a movable optical passage capable of changing the light intensity distribution informations, and two separate light receiving units, each consisting of a plurality of photoelectric elements and receiving incident light through respective optical passages, are provided for the focus detection.

Accordingly, an object of the present invention is to provide an automatic focusing camera of good accessibility and high accuracy.

According to the present invention, in an automatic focusing camera capable of determining the focus position of the lens by automatically detecting the distance between an object and the camera, a charged actuating member is released by a shutter releasing member before the shutter releasing member releases the shutter, then the actuating member performs a series of operations from range measurement to retention of the range setting member. In case focus detection is impossible, the actuating member can be restored to the initial position by restoring the shutter releasing member allowing repetition of the series of operations as described above.

Furthermore, the motion of the lens stopping member is not affected by the shutter releasing speed so that the lens stopping member is accurately adjusted to a correct position as the lens stopping member is driven by the actuating member at a controlled speed.

Still further, the present invention improves the accuracy of the range measurement system because range measurement is not affected by difference in sensitivity between photoelectric elements or difference between optical passages as a single image lens and a single unit of photoelectric elements are employed for obtaining light informations through a stationary optical passage and a movable optical passage.

Figure 1:
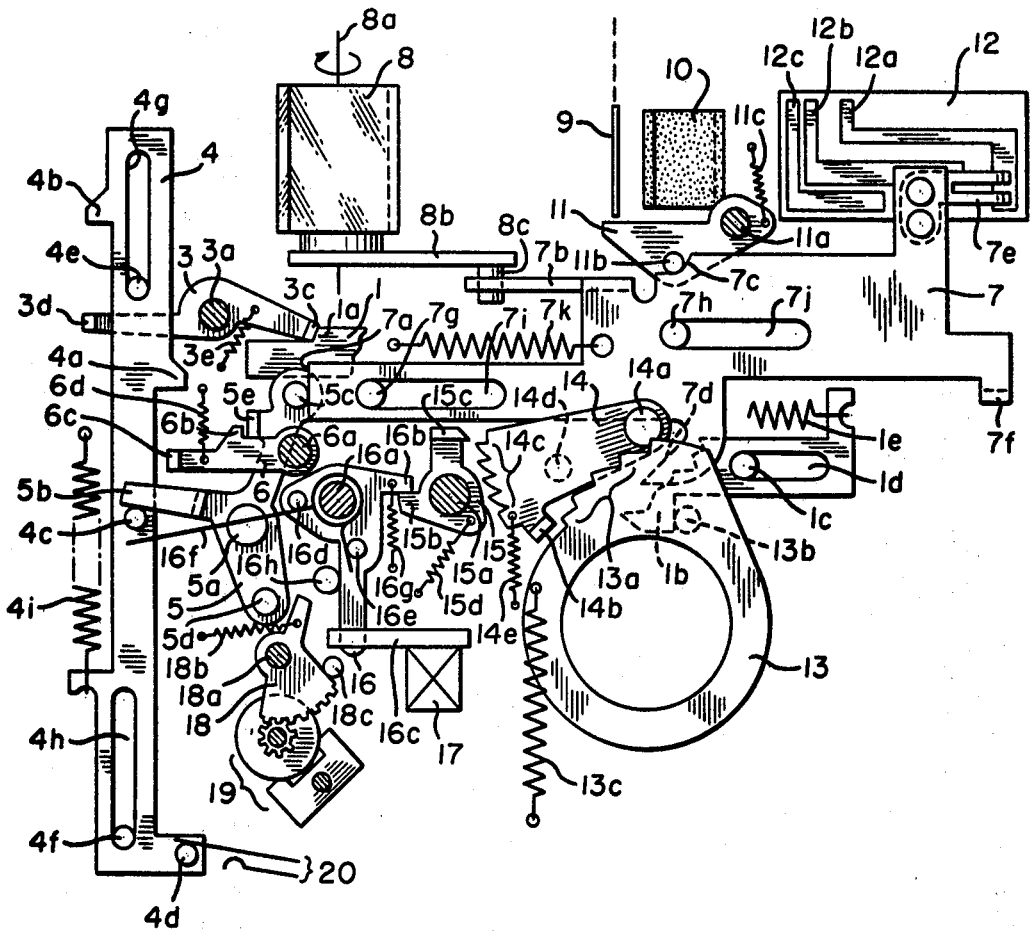
FIG. 1 is a schematic illustration of a preferred embodiment according to the present invention in charged state.

In the drawings, reference numerals designate; (1): a shutter charging member, (4): a shutter releasing member, (5): an intermediate lever, (7): an actuating member, (8): a movable mirror, (9): a sectoral plate, (10): a half mirror, (12): a switch base plate, (13): a focus adjusting member, (14): a lens stopping member, (15): a stopping piece, (16): an armature lever, (17): an electromagnet, (20): a main switch, (31): an image lens, (32): photoelectric elements, (33): an information processing circuit and (34): a power source.

FIG. 1 is a preferred embodiment according to the present invention illustrating the device in charged state. A fixed base plate is not shown for convenience of explanation.

Referring to FIG. 1, a shutter charging member (1) having a shoulder part (1a), a projection (1b) and a slot (1d) is guided by a pin (1c) fixed on the stationary base plate and inserted in the slot (1d), and strained by a spring (1e) fixed on the stationary base plate at one end. A stopper (3) for stopping the charging member (1) having a bent part (3c) which engages with the shoulder part (1a) of the charging member (1) and a bent part (3d) at opposite end thereof is rotatably fitted on a shaft (3a) fixed on the base plate and urged clockwise by a spring (3c). A shutter releasing member (4) having projections (4a) and (4b), pins (4c) and (4d), and slots (4g) and (4h) is guided by pins (4e) and (4f) both fixed on the base plate and urged upwards by a spring (4i). An intermediate lever (5) having an arm (5b), pins (5c) and (5d), and a bent part (5e) is rotatably fitted on a shaft (5a) fixed on the base plate. A stopper (6) for stopping the intermediate lever (5) having a projection (6b) and a bent part (6c) is rotatably fitted on a shaft (6a) and urged clockwise by a spring (6d). An actuating member (7), having a face (7a) engaging with the pin (5c) of the intermediate lever (5), a bent part (7b) having a cam slot, an inclined face (7c), a cam surface (7d), a contact piece (7e), a bent part (7f) and slots (7i) and (7j) within which guiding pins (7g) and (7h) are inserted, respectively, is strained by the spring (4i) for the shutter releasing member (4) through the intermediate lever (5) and straining a spring (7k). A movable mirror (8) having an arm (8b) and a pin (8c) thereon engaging with the cam slot on the bent part (7b) is rotatable on a shaft (8a). A sectoral plate (9) shields the movable optical passage. (10) designates a half mirror. A sector lever (11) having a pin (11b) operates the sectoral plate (9). The sector lever (11) is rotatably fitted on a shaft (11a) fixed on the base plate and urged counterclockwise by a spring (11c). A switch base plate

(12) is kept in contact with the contact piece (7e) provided on the actuating member (7). (12a), (12b) and (12c) designate a series of contact points. A focus adjusting member (13) having a step cam part (13a) and a pin (13b) regulates the position of the lens by rotating about the center of the lens. Although the focus adjusting member (13) is urged counterclockwise by a spring (13c), the counterclockwise rotation is checked with the projection (1b) of the shutter charging member touching the pin (13b). A lens stopping member (14) having a bent part (14b) to be engaged with the step cam (13a) of the focus adjusting member (13), stopping teeth (14c) and a pin (14d) to be engaged with the cam face (7d) of the actuating member (7) is rotatably fitted on a shaft (14a) fixed on the base plate and urged counterclockwise by a spring (14e). A stopping piece (15) having a projection (15b) and a pawl (15c) is rotatably fitted on a shaft (15a) fixed on the base plate and urged clockwise by a spring (15d). The stopping piece (15) checks the lens stopping member (14) by engaging with the stopping teeth (14c). An armature lever (16) having an arm (16b) engaging with the projection (15b), an armature (16c) and pins (16d) and (16e) is rotatably fitted on a pin (16a) fixed on the base plate. A main spring (16f) is engaged with the pins (16d) and (16e). The armature lever (16) is urged clockwise by a spring (16g) and checked at a fixed position by a stop pin (16h) fixed on the base plate. An electromagnet (17) actuates the armature (16c) of the armature lever (16). A breaking plate (18) having an arm extending within the path swept by the pin (5d) of the intermediate lever (5) is rotatably fitted on a shaft (18a) fixed on the base plate, urged counterclockwise by a spring (18b) and checked at a fixed position by a stop pin (18c) fixed on the base plate. (19) and (20) designate a gear train for controlling the breaking plate (18) and a main switch, respectively.

Figure 2:
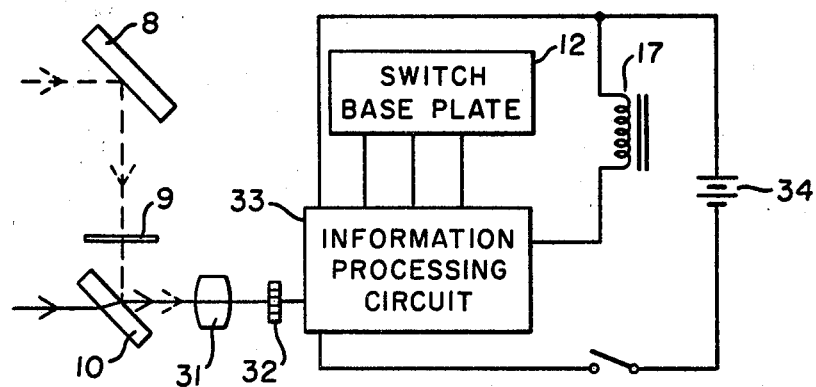
FIG. 2 is an explanatory diagram of optical passages and a light information processing circuit of the present invention.

FIG. 2 is a schematic diagram illustrating the elelctrocal processing of light informations according to the present invention, in which, an image lens (31), a unit of photoelectric elements (32), an information processing circuit (33) and a power source (34) are shown. Explanation on the other reference numerals are omitted as they correspond to those explained in FIG. 1.

In operation, as the shutter releasing member (4) is depressed from its rest position and begins forward movement, sequential actions start; the pin (4d) on the shutter releasing member (4) descends during a first stage of forward movement of the shutter releasing member to allow the main switch (20) to close so that the electricity is supplied to the circuit of FIG. 2, then the electromagnet (17) is excited to attract and hold the entrance (16c). Simultaneously, the pin (4c) on the shutter releasing member (4) descends during the first stage of movement and separates from the arm (5b) allowing the counterclockwise rotation of the intermediate lever (5) by the action of the spring (7k) urging the actuating member (7) leftwards until the bent part (5c) comes to hit on the projection (6b) of the stopper (6). The actuating member (7) moves only for a short distance corresponding to the rotation of the intermediate lever (5) and remains near the initial position. With the further downward movement of the shutter releasing member (4) in the first stage of movement, the pin (4c) on the shutter releasing member (4) starts pressing the main spring (16f) engaging with the armature lever (16), however, the rotation of the armature layer (16) is impossible as the armature (16c) has previously been held by the electromagnet (17) so that the main spring (16f) is strained.

As the shutter releasing member continues to move downwards during the first stage of forward movement, the projection (4a) pushes the stopper (6) at the bent part (6c) to turn the stopper (6) counterclockwise so that the intermediate lever (5) is releaed, then the actuating member (7) which has been retained by the pin (5c) on the intermediate lever (5) is allowed to start travelling being pulled by the spring (7k). By this moment, the pin (4c) on the shutter releasing member (4) has already descended as far as the position where the pin (4c), will not interfere with the counterclockwise rotation of the intermediate lever (5) and this position of the shutter releasing member (4) corresponds to the end of the first stage of movement.

Detailed explanation will be made hereinafter particularly on the switch base plate (12). The contact point (12a) serves as a switch for memorizing the light informations of the stationary optical passage. A series of contact points (12b) serve as switches for detecting the angle of rotation of the movable mirror (8). Another series of contact points serve (12c) serve as switches for detecting the angle of rotation of the lens stopping member (14).

After the actuating member (7) has started moving, the contact piece (7e) separates from the contact point (12a) of the switch base plate (12) and memorizes the light informations of the stationary optical passage. Subsequently, the inclined face (7c) of the actuating member (7) pushes the sector lever (11) at the pin (11b) to turn the sector lever (11) clockwise so that the sectoral plate (9) is pushed away to disclose the movable optical passage. The light informations of the movable optical passage are reflected by the half mirror (10) to the photoelectric elements (32), then transmitted to the information processing circuit (33).

As the actuating member (7) travels further, a bent part (7b) having a cam slot starts turning the movable mirror (8), simultaneously with the start of the movable mirror (8), the contact piece (7e) comes in contact with the series of contact points (12b) of the switch base plate (12) and the angle of rotation of the movable mirror (8) is transmitted to the information processing circuit (33) in the corresponding electric signals, such as electric pulses.

Accordingly, when the light information of the movable optical passage agreed with the previously memorized light information of the stationary optical passage, the angle of rotation of the movable mirror (8) at this moment is memorized by the information processing circuit (33) in the form of electric signals, such as a number of pulses.

When the actuating member (7) reaches a position after turning the movable mirror (8) for a previously fixed angle corresponding to ranges covering the minimum range and the infinite range, the face (7a) of the actuating member (7) pushes the pin (5c), which actuates the pin (5d) of the intermediate layer (5) to operate the breaking member (18). In the occasion that the shutter releasing member (4) descends slowly relative to the speed controlled by the breaking member (18), the arm (5b) of the intermediate layer (5) is controlled by the pin (4c) of the shutter release member (4), consequently, the travelling speed of the actuating member (7) is determined by the descending speed of the shutter releasing member (4).

In another occasion that the shutter releasing member (4) descends fast relative to the speed controlled by the breakin member (18), the actuating member (7) is allowed to travel under control of the breaking member (18) thereafter.

The actuating member (7) continues to travel under control of the breaking member (18) and the cam face (7d) thereof comes in contact with the pin (14d) of the lens stopping member (14) starting clockwise rotation of the lens stopping member (14). Practically at the same time, the contact piece (7e) of the actuating member (7) come in contact with the contact points (12c) of the switch base plate (12) to transmit an electric signal, such as pulses, corresponding to the angle of rotation of the lens stopping member (14) to the information processing circuit (33). when this electric signal and the electrical signal corresponding to the angle of rotation of the movable mirror (8) and previously memorized by the information processing circuit (33) coincide, the information processing circuit (33) produces a signal commanding to cut off electricity supply to the electromagnet (17) so that the retention of the armature (16c) is cancelled. The main spring (16f) having previously been strained by the pin (4c) of the shutter releasing member (4) and provided with a springing force exceeding the counter force of the resetting spring (16g), the armature lever (16) is turned counterclockwise by the main spring (16f) when the armature (16c) is released.

According to the counterclockwise rotation of the armature lever (16), the arm (16b) of the armature lever (16) escapes from the projection (15b) of the stopping piece (15) allowing clockwise rotation of the stopping piece (15) so that the pawl (15c) stops the lens stopping member (14) engaging with the stopping teeth (14c). As the clockwise rotation of the lens stopping member is checked, the actuating member (7) also is stopped as the cam face (7d) of the actuating member (7) is obstructed by the pin (14d) of the lens stopping member (14). The photographing range is indicated by a range indicating mechanism, not shown, coupled with the bent part (7f) of the actuating member (7).

Before advancing the explanation on the operations actuated by the further depression of the shutter releasing member (4), explanation on the operation of the mechanism caused by return motion of the shutter releasing member (4) from the position as described hereinbefore will be interposed.

When the depression on the shutter releasing member (4) is cancelled while the shutter releasing member is in the range of its first stage of movement, the shutter releasing member (4) starts moving upwards being pulled by the spring (4a), then the intermediate layer (5) is turned clockwise being pushed by the pin (4c) at the arm (5b), subsequently, the pin (5c) of the intermediate layer (5) pushes the actuating member (7) at the face (7a) so that the actuating member (7) is returned to the initial position straining the spring (7k). Consequently, the movable mirror (8), the sectoral plate (9) and the contact plate (7e) are allowed to return to the initial position.

The bent part (5e) of the intermediate lever (5) moves over the projection (6b) of the stopper (6) so that the stopper (6) is allowed to return to the intermediate lever checking position.

According to the return of the intermediate lever (5) to the initial position, the breaking member (18), which has been applying a breaking force to the intermediate lever (5) at the pin (5d) is reset to the original position by the spring (18b).

The armature lever (16) is returned to the initial position by the spring (16g) as the spring force applied to the armature lever (16) by the main spring (16f) at the pin (16e) is cancelled according to the upward movement of the pin (4c) of the shutter releasing member (4). Following the resetting motion of the armature lever (16), the stopping piece (15) is turned counterclockwise and the lens stopping member (14) is allowed to return to the initial position being pulled by the spring (14e).

Returning to the explanation on the operation of the device after the actuating member (7) has been stopped, as the shutter releasing member (4) is depressed still further to being a second stage of forward movement, the projection (4b) of the shutter releasing member (4) pushes the stopper (3) at the bent part (3d) to turn counterclockwise. As the other bent part (3c) of the stopper (3) escapes from the shoulder part (1a) of the charging member (1), the charging member (1) is allowed to start travelling being pulled by the spring (1e). Subsequently, the restraint on the focus adjusting member (13) at the pin (13b) by the projection (1b) of the charging member (1) is cancelled so that the focus adjusting member (13) is allowed to turn counterclockwise being pulled by the spring (13c) until one of the steps of the step cam (13a) corresponding to the previously fixed position of the bent part (14b) of the lens stopping member (14) comes to engage with the bent part (14b), thus completing the focus adjustment of the lens.

The charging member (1) continues to travel further and actuates the shutter, not shown, near the end of its travel, thus completing the exposure operation.

When the depression on the shutter releasing member (4) is removed at the completion of photographing, the shutter releasing member (4) starts moving upwards, then the armature lever (16) begins to turn clockwise being pulled by the spring (16g) as the pin (4c) separates from the main spring (16f) cancelling the strain of the main spring (16f), however, this clockwise rotation of the armature lever (16) is checked by the stopping piece (15) which is retained at the operating position with the pawl (15c) constrained by one of the stopping teeth (14c) of the lens stopping member (14) which is pressed by the focus adjusting member (13) through the engagement of the bent part (14b) and the step cam (13a). Accordingly, the focus adjusting member (13) remains at the present position keeping the lens at the corresponding focused position as the lens stopping member (14) keeps constraining the stopping piece (15) until the focus adjusting member (13) is recharged for the next photographing.

The device according to the present invention being thus composed, the actuating member can be returned to the initial position from any position during the operation of the shutter releasing member before the start of the focus adjusting member (before the shutter releasing member actuates the charging member), therefore, interruption of photographing or repetition of range measurement is possible.

Furthermore, range measurement is performed within a short period of time as the actuating member operates at an extremely high speed in the range measurement process, therefore, the device of this invention is available to photographing moving objects.

Still further, the actuating member travels at a speed controlling by the breaking device or at a speed proportional to the speed of the shutter releasing member when the shutter releasing member is pushed downwards at a relatively high speed or at a relatively low speed, respectively, therefore, the operating speed of the lens stopping member is controlled under a fixed speed so that the lens stopping member is securely stopped at the focus positions.

Furthermore, photographing range can be indicated by coupling a range indicating device with the actuating member as the actuating member is stopped interlocking with the lens stopping member checking operation.

The described invention provides a precision, highly accessible, simply constructed and reliable automatic focusing device for a camera.

What is claimed is:

1. In an automatic focusing camera of the type which automatically regulates the position of a photographing lens to bring the lens into focus with respect to an object field to be photographed by detecting a distance between the object field and the camera: a movable shutter releasing member movable in first and second stages from a rest position, which corresponds to the beginning of the first stage, to a shutter-operating position for initiating operation of a shutter, which corresponds to the ending of the second stage; detecting means operable when actuated for detecting the distance between an object field to be photographed and the camera; a movable actuating member having a charged position and operable when released from the charged position to undergo movement in one direction to actuate the detecting means; means including a movable stopper operable in response to the movement of the shutter releasing member during the first stage of forward movement thereof and before reaching the second stage of forward movement thereof for permitting the actuating member to move in one direction to thereby enable the actuating member to actuate the detecting means; and means coacting with the shutter releasing member for releasably interlocking the actuating member with the shutter releasing member during the course of return movement of the shutter releasing member to its rest position after the actuation of the detecting means to thereby enable the actuating member to be returned to its charged position in interlocked relationship with the return motion of the shutter releasing member in the event the shutter releasing member is returned to its rest position without having reached its shutter-operating position whereby the camera operator can confirm the focusing range prior to shutter operation.

2. An automatic focusing camera according to claim 1; further including a movable focus adjusting member for adjustably positioning the photographing lens; a movable lens stopper member movable to different positions for determining the stop position of the focus adjusting member; and means on the actuating member for driving the lens stopper member to different positions in response to movement of the actuating member.

3. An automatic focusing camera according to claim 2; further including delay means for controllably delaying the movement of the actuating member.

4. An automatic focusing camera according to any of claims 1, 2 or 3; wherein said means coacting with the shutter releasing member for releasably interlocking the actuating member with the shutter releasing member comprises a turnable intermediate lever having one lever arm engageable with the actuating member and another lever arm engageable with a pin on the shutter releasing member so that when the shutter releasing member is in its rest position the actuating member is retained in its charged position and when the shutter releasing member undergoes forward movement from its rest position toward its shutter-operating position the intermediate lever can turn in one direction thereby permitting movement of the actuating member; and wherein said movable stopper comprises a turnable spring-biased stopper having one projection engageable with the intermediate lever after the intermediate lever has turned a short distance in the one direction to thereby prevent further turning of the intermediate lever and further movement of the actuating member, and another projection engageable with the shutter releasing member during further forward movement of the shutter releasing member to release the intermediate lever thereby permitting further movement of the actuating member, the pin on the shutter releasing member and the one lever arm of the intermediate lever being so positioned that in the event of return motion of the shutter releasing member to its rest position without the shutter releasing member having reached its shutter-operating position, the return movement of the shutter releasing member causes the pin to engage with and turnably drive the intermediate lever in the reverse directions to thereby return the actuating member to its charged position.

* * * * *